US007870444B2

(12) United States Patent
Teo

(10) Patent No.: US 7,870,444 B2
(45) Date of Patent: Jan. 11, 2011

(54) SYSTEM AND METHOD FOR MEASURING AND CORRECTING DATA LANE SKEWS

(75) Inventor: Jeff Boon Kiat Teo, Singapore (SG)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 1415 days.

(21) Appl. No.: 11/249,210

(22) Filed: Oct. 13, 2005

(65) Prior Publication Data

US 2007/0103338 A1 May 10, 2007

(51) Int. Cl.
*G06K 5/04* (2006.01)
*G06K 5/02* (2006.01)

(52) U.S. Cl. .................................... 714/700; 714/707

(58) Field of Classification Search ..................... None
See application file for complete search history.

(56) References Cited

U.S. PATENT DOCUMENTS 3,833,888 A * 9/1974 Stafford et al. ................ 710/1
4,499,434 A * 2/1985 Thompson .................. 331/17
4,600,991 A * 7/1986 Schonberger et al. ....... 712/214
5,355,493 A * 10/1994 Silberbauer et al. ......... 717/136
5,425,020 A * 6/1995 Gregg et al. ............... 370/252
6,041,062 A * 3/2000 Yamato et al. ............. 370/465
6,467,689 B1 * 10/2002 Kaji .......................... 235/475
6,515,962 B1 * 2/2003 Sawey et al. ............... 370/228
6,999,891 B2 * 2/2006 Pepper ...................... 702/122
7,010,607 B1 * 3/2006 Bunton ...................... 709/228
7,570,659 B2 * 8/2009 Susnow et al. ............. 370/465
2002/0131105 A1 * 9/2002 Herrity ...................... 359/124
2002/0138675 A1 9/2002 Mann ......................... 710/61
2004/0071250 A1 4/2004 Bunton et al. .............. 375/372
2005/0015522 A1 1/2005 Elboim et al. ................ 710/52

* cited by examiner

*Primary Examiner*—Jeffrey A Gaffin
*Assistant Examiner*—Dipakkumar Gandhi

(57) ABSTRACT

A system and method for measuring and correcting data lane skews uses a predefined datum within data streams transmitted on different data lanes to determine the fastest data lane and to compute relative data lane skew values for the data lanes with respect to the fastest data lane. The relative data lane skew values are then used to compensate for the data lane skews.

20 Claims, 5 Drawing Sheets

114
FIFO Buffer 108A
FIFO Buffer 108B
FIFO Buffer 108C
FIFO Buffer 108D
226
Datum
228
Pointer Value
218A
218B
218C
218D
Datum Detector
Sticky Registers 230
Datum Found
232A
232B
232C
232D
220
Fastest Lane Decoder
Combinational Logics
234
236
Storage Registers
240
238
222
Fastest Lane No
All found
Skew Computation Unit
Skew Computation Circuit 244
Error Detection Circuit 246
Relative Lane Skew Values
error
Lane Skew Registers 224
242

SYSTEM AND METHOD FOR MEASURING AND CORRECTING DATA LANE SKEWS

BACKGROUND OF THE INVENTION

The continuing demands for higher performance and higher speed I/O interconnect have resulted in the development of I/O architectures such as the 10-Gigabit Fiber Channel (10GFC), 10-Gigabit Ethernet (10GbE), Peripheral Component Interconnect (PCI) Express and the Infiniband. These I/O architectures implement multiple serial interconnections (known as "lanes") in order to meet the high data rate requirement and at the same time resolve conspicuous bit-to-bit skew problem present in a high-speed parallel transmission. This solution gives rise to a new set of design challenges, one of which is how to handle lane-to-lane data skews. While the data lanes often transmit data simultaneously, differences in data arrival time are expected at the receiving end due to different path delays and latencies between the lanes. Sources of path delays can be in the chip drivers/receivers, mismatches in routing traces, differences in electrical cable length, differences in serialization/deserialization channels and others. In order to ensure the correctness of the received data, there exists a need to measure the amount of data skews and subsequently compensate for the data skews.

Conventional techniques to measure and compensate for data skews have different concerns. As an example, for conventional absolute lane skew compensation techniques, verification and debugging become complex when data lane count and FIFO depth are increased, which lengthen development time. As another example, for conventional serial deskew compensation techniques, the circuits are difficult to design and require long simulation time due to the extremely high speed circuits involved. In addition, since these circuits are running at some ten times the frequency, power consumption is proportionally high. Other conventional techniques may require training procedures and may be dependent on the I/O architecture.

In view of these concerns, what is needed is a system and method for measuring and correcting data skews that alleviates some of the above-identified concerns.

SUMMARY OF THE INVENTION

A system and method for measuring and correcting data lane skews uses a predefined datum within data streams transmitted on different data lanes to determine the fastest data lane and to compute relative data lane skew values for the data lanes with respect to the fastest data lane. The relative data lane skew values are then used to compensate for the data lane skews.

A system for measuring and correcting data lane skews in accordance with an embodiment of the invention comprises a plurality of first-in first-out buffers to receive data streams transmitted on different data lanes and a skew measurement unit operatively connected to the first-in first-out buffers. Each of the data streams contains a predefined datum. The skew measurement unit is configured to determine the fastest data lane of the different data lanes. The fastest data lane is one of the different data lanes connected to one of the first-in first-out to first receive the predefined datum. The skew measurement unit is further configured to compute relative lane skew values with respect to the fastest data lane for the different data lanes. The first-in first-out buffers are configured to compensate for the data lane skews by delaying the faster lanes with their respective relative data lane skew values.

A system for measuring and correcting data lane skews in accordance with another embodiment of the invention comprises a plurality of first-in first-out buffers to receive data streams transmitted on different data lanes, a plurality of datum detectors operatively connected to the first-in first-out buffers, a fastest lane decoder operatively connected to the datum detectors and a skew computation unit operatively connected to the fastest lane decoder and the datum detectors. Each of the data streams contains a predefined datum. Each of the datum detectors is configured to detect the predefined datum within one of the data streams received at the first-in first-out buffers. The fastest lane decoder is configured to determine the fastest data lane of the different data lanes. The fastest data lane is one of the different data lanes connected to one of the first-in first-out to first receive the predefined datum. The skew computation unit is configured to compute the relative lane skew values with respect to the fastest data lane for the different data lanes. The first-in first-out buffers are configured to compensate for the data lane skews using the relative lane skew values.

A method for measuring and correcting data lane skews in accordance with an embodiment of the invention comprises receiving data streams transmitted on different data lanes, each of the data streams containing a predefined datum, determining the fastest data lane of the different data lanes using the predefined datum within the data streams, the fastest data lane being one of the different data lanes from which the predefined datum is first received, computing relative lane skew values with respect to the fastest data lane for the different data lanes, and compensating the data lane skews using the relative lane skew values.

Other aspects and advantages of the present invention will become apparent from the following detailed description, taken in conjunction with the accompanying drawings, illustrated by way of example of the principles of the invention.

DETAILED DESCRIPTION

Figure 1:
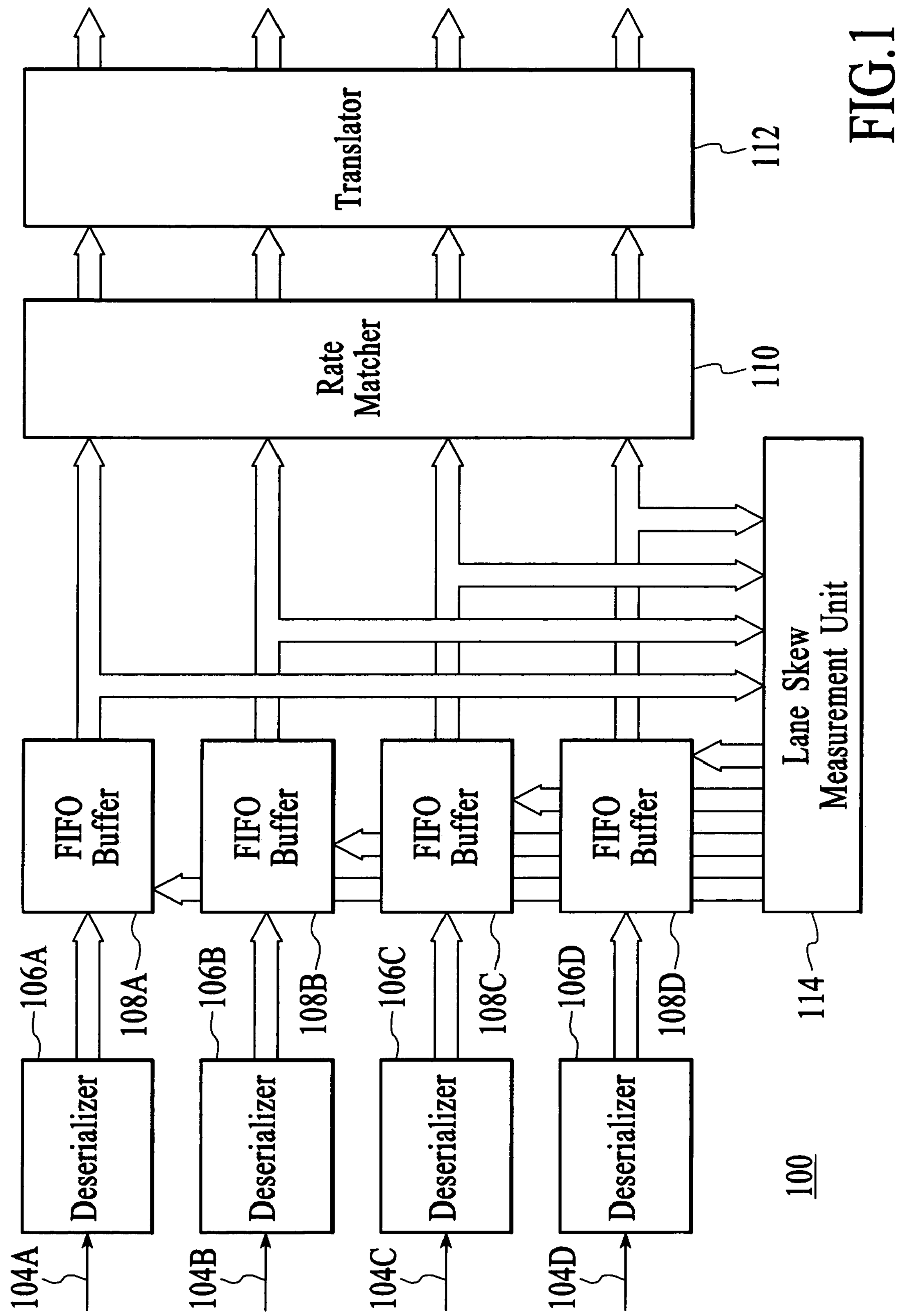
FIG. 1 is a block diagram of an XGMII extender sublayer (XGXS) receiver system in accordance with an embodiment of the invention.

With reference to FIG. 1, an XGMII extender sublayer (XGXS) receiver system 100 in accordance with an embodiment of the invention is described. The XGXS receiver system 100 includes a lane skew measurement unit 114, which operates to measure data lane skews, as described in detail below. Although the lane skew measurement unit 114 is described herein as being part of the XGXS receiver system 100, the lane skew measurement unit 114 can be incorporated in a different type of a receiver system.

As shown in FIG. 1, in this embodiment, the XGXS receiver system 100 is configured to receive serialized streams of data from a transmitter system (not shown) transmitted on four different data lanes 104A, 104B, 104C and 104D in parallel. However, in other embodiments, the XGXS receiver system 100 may be configured to receive data streams transmitted on any number of data lanes. The XGXS receiver system 100 includes deserializers 106A, 106B, 106C and 106D, first-in first-out (FIFO) buffers 108A, 108B, 108C and 108D, the lane skew measurement unit 114, a rate matcher 110 and a translator 112. The deserializers 106A, 106B, 106C and 106D are individually connected to the data lanes 104A, 104B, 104C and 104D, respectively, to receive the serialized data streams transmitted on the data lanes. Each of the deserializers 106A, 106B, 106C and 106D operates to deserialize the serialized data stream on the data lane connected to that deserializer. Similarly, the FIFO buffers 108A, 108B, 108C and 108D are individually connected to the deserializers 106A, 106B, 106C and 106D, respectively, to temporarily store the deserialized data streams as the data streams are continuously received from the data lanes. The FIFO buffers 108A, 108B, 108C and 108D are connected to the lane skew measurement unit 114 so that data stored in the FIFO buffers, as well as the corresponding internal read pointers of the FIFO buffers for each of the data, can be read by the lane skew measurement unit 114.

The lane skew measurement unit 114 receives the deserialized data streams and the corresponding internal read pointer values from the FIFO buffers 108A, 108B, 108C and 108D. The lane skew measurement unit 114 processes the received deserialized data streams using the corresponding read pointer values to produce relative lane skew values, which are measurements of lane skews in the deserialized data streams transmitted on the data lanes 104A, 104B, 104C and 104D. The relative lane skew values provide information regarding lane skews with respect to the data streams transmitted on the different data lanes 104A, 104B, 104C and 104D. As described in more detail below, the relative lane skew values are positional differences of predefined symbol or datum within the data streams in the FIFO buffers 108A, 108B, 108C and 108D. Since the data streams are received in parallel at the FIFO buffers 108A, 108B, 108C and 108D, these relative lane skew values provide measurements of data lane skews. The lane skew measurement unit 114 outputs the relative lane skew values to the first-in first-out buffers 108A, 108B, 108C and 108D. Using the relative lane skew values from the lane skew measurement unit 114, the first-in first-out buffers 108A, 108B, 108C and 108D compensate for the data lane skews in the deserialized data streams to produce deskewed data streams. This is achieved by pausing the write pointers in the first-in first-out buffers 108A, 108B, 108C and 108D by the respective relative lane skew values. The effect of the write pointer pausing is that lanes with smaller relative lane skew values are delayed more. Hence the fastest lane will be delayed the most by this mechanism. Thus, using the relative lane skew values, the data streams from the data lanes 104A, 104B, 104C and 104D can be selectively delayed so that the data streams are aligned to each other.

The deskewed data streams are transmitted to the rate matcher 110, where the data streams are synchronized. The synchronized data streams are then transmitted to the translator 112. In this embodiment, the translator converts A, K and R symbols back to the original Idle (I) symbols. The translated data streams are then transmitted from the translator 112 to downstream components (not shown) for further processing.

Figure 2:
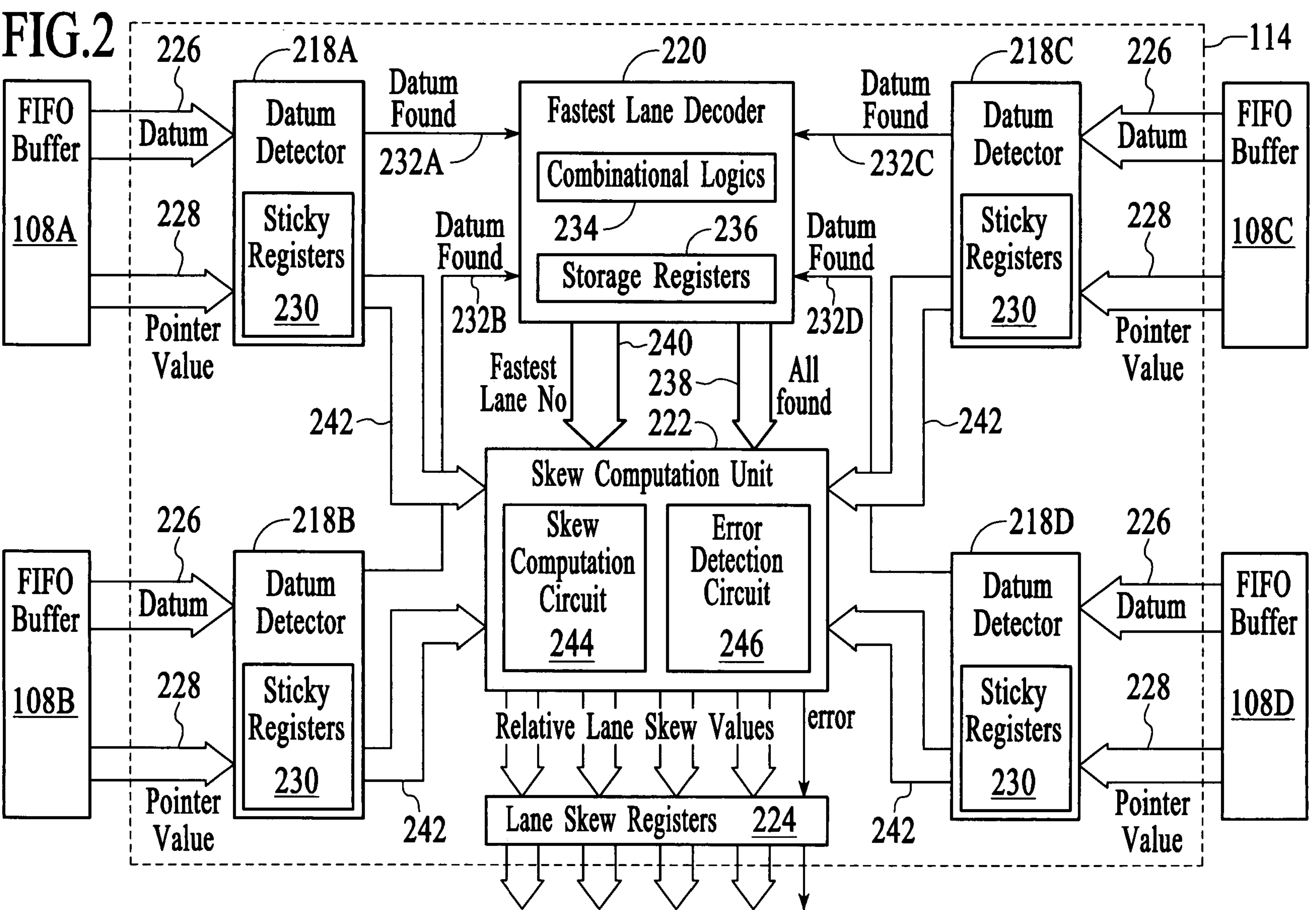
FIG. 2 is a block diagram of a lane skew measurement unit included in the XGXS receiver system of FIG. 1 in accordance with an embodiment of the invention.

The lane skew measurement unit 114 is further described with reference to FIG. 2, which is a block diagram of the components of the lane skew measurement unit in accordance with an embodiment of the invention. As shown in FIG. 2, the lane skew measurement unit 114 includes datum detectors 218A, 218B, 218C and 218D, a fastest lane decoder 220 and a skew computation unit 222 and lane skew registers 224. The lane skew measurement unit 114 is designed for measuring data skews for data streams transmitted on four data lanes. However, the lane skew measurement unit 114 can be modified to measure data skews for data streams transmitted on any number of data lanes.

Each of the datum detectors 218A, 218B, 218C and 218D is connected to one of the FIFO buffers 108A, 108B, 108C and 108D via two buses 226 and 228. The bus 226 is used to carry the data stream from each of the FIFO buffers 108A, 108B, 108C and 108D to the connected datum detector 218A, 218B, 218C or 218D. The other bus 228 is used to carry the internal read pointer values from each of the FIFO buffers 108A, 108B, 108C and 108D to the connected datum detector 218A, 218B, 218C or 218D. Each of the datum detectors 218A, 218B, 218C and 218D includes sticky registers 230, which can hold a value when a predefined condition is satisfied. When one of the datum detectors 218A, 218B, 218C and 218D detects the presence of a predefined datum in the data streams, e.g., "A" of AKR idle sequence, the sticky registers 230 register and hold the read pointer value for that datum. This read pointer value is subsequently used by the skew computation unit 222, as described below. In addition, when one of the datum detectors 218A, 218B, 218C and 218D detects a predefined datum, the datum detector generates a datum found signal, which is held active from the time the predefined datum is found.

The fastest lane decoder 220 is connected to the datum detectors 218A, 218B, 218C and 218D via buses 232A, 232B, 232C and 232D, respectively, to receive datum found signals from the datum detectors. The fastest lane decoder 220 operates to determine the fastest data lane of the data lanes 104A, 104B, 104C and 104D by sensing the first datum found signal on one of the buses 232A, 232B, 232C and 232D. The fastest lane decoder 220 can be implemented with combination logics 234 and storage registers 236. The combinational logics 234 generate the fastest lane number when the first datum found signal appears on one of the buses 232A, 232B, 232C and 232D. In this example of four data lanes, the fastest lane decoder 220 includes two storage registers. The storage registers 236 operate to latch onto the fastest lane number when its corresponding datum found signal is active. Thus, the fastest lane decoder 220 determines the fastest data lane by detecting the first datum found signal from one of the datum detectors 218A, 218B, 218C and 218D on one of the buses 232A, 232B, 232C and 232D, which means that the predefined datum is first received by the FIFO buffer connected to that datum detector. As an example, if a datum found signal is first detected on the bus 232A connected to the datum detector 218A, then the fastest lane decoder 220 can determine that the data lane 104A, which is connected to the datum detector 218A via the FIFO buffer 108A and the deserializer 106A, is the fastest data lane. Below is the truth table for the combinational logics 234 of the fastest lane decoder 220.

| Bus 232A | Bus 232B | Bus 232C | Bus 232D | Out1 | Out2 | Status |
|---|---|---|---|---|---|---|
| 0 | 0 | 0 | 0 | 0 | 0 | Fast lane number not latched |
| 0 | 0 | 0 | 1 | 0 | 0 | Fast lane number latched |
| 0 | 0 | 1 | 0 | 0 | 1 | Fast lane number latched |
| 0 | 0 | 1 | 1 | 0 | 1 | Fast lane number latched |

-continued

| Bus 232A | Bus 232B | Bus 232C | Bus 232D | Out1 | Out2 | Status |
|---|---|---|---|---|---|---|
| 0 | 1 | 0 | 0 | 1 | 0 | Fast lane number latched |
| 0 | 1 | 0 | 1 | 1 | 0 | Fast lane number latched |
| 0 | 1 | 1 | 0 | 1 | 0 | Fast lane number latched |
| 0 | 1 | 1 | 1 | 1 | 0 | Fast lane number latched |
| 1 | 0 | 0 | 0 | 1 | 1 | Fast lane number latched |
| 1 | 0 | 0 | 1 | 1 | 1 | Fast lane number latched |
| 1 | 0 | 1 | 0 | 1 | 1 | Fast lane number latched |
| 1 | 0 | 1 | 1 | 1 | 1 | Fast lane number latched |
| 1 | 1 | 0 | 0 | 1 | 1 | Fast lane number latched |
| 1 | 1 | 0 | 1 | 1 | 1 | Fast lane number latched |
| 1 | 1 | 1 | 0 | 1 | 1 | Fast lane number latched |
| 1 | 1 | 1 | 1 | 1 | 1 | Fast lane number latched |

The fastest lane decoder 220 is also configured to generate an all found signal on bus 238 when each of the datum detectors 218A, 218B, 218C and 218D provides a datum found signal. The all found signal indicates that the predefined datum was found within the data stream in each of the FIFO buffers 108A, 108B, 108C and 108D.

The skew computation unit 222 is connected to the fastest lane decoder 220 via bus 240 to receive the latched fastest lane number and via the bus 238 to receive the all found signal. The skew computation unit 222 is also connected to the datum detectors 218A, 218B, 218C and 218D via buses 242 to receive the internal pointer values held in the sticky registers 230 of the datum detectors, which provide positional information of the detected predefined datum in the FIFO buffers 108A, 108B, 108C and 108D.

As shown in FIG. 2, the skew computation unit 220 includes a skew computation circuit 244 and an error detection circuit 246. The skew computation circuit 244 operates to produce relative skew values for the data lanes 104A, 104B, 104C and 104D using the pointer values from the datum detectors 218A, 218B, 218C and 218D and the fastest lane number from the fastest lane decoder 220. The error detection circuit 246 operates to generate an error signal when at least one of the computed relative skew values exceeds a predefined threshold value.

Figure 3:
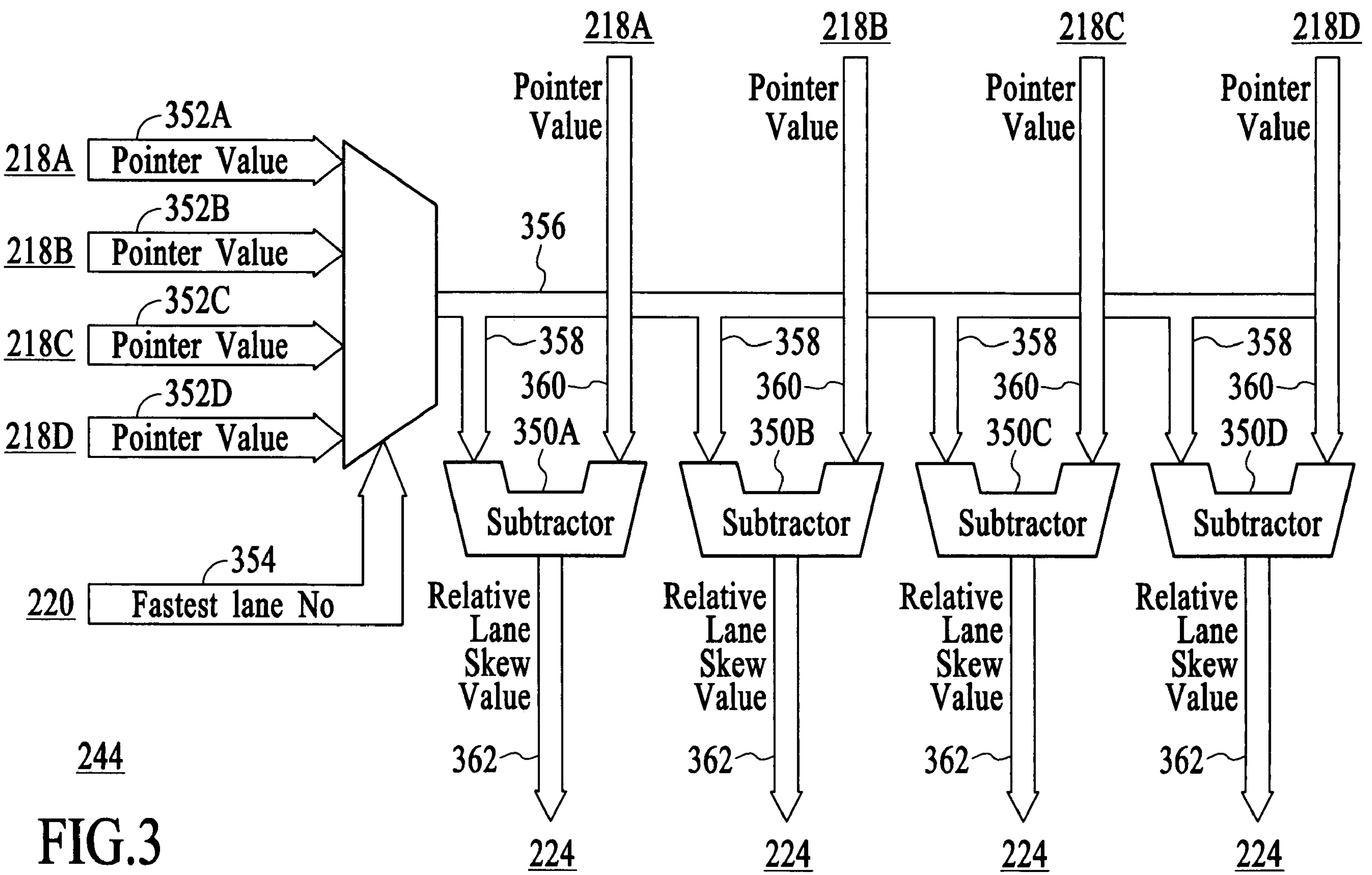
FIG. 3 is a block diagram of a skew computation circuit included in the lane skew measurement unit of FIG. 2 in accordance with an embodiment of the invention.

Turning now to FIG. 3, a block diagram of the components of the skew computation circuit 244 in accordance with an embodiment of the invention is shown. In this embodiment, the skew computation circuit 244 includes a multiplexer 348, and four subtractors 350A, 350B, 350C and 350D. The multiplexer 348 includes five inputs 352A, 352B, 352C, 352D and 354 and a single output 356. The inputs 352A, 352B, 352C and 352D are used to receive the pointer values from the datum detectors 218A, 218B, 218C and 218D, respectively. The input 354 is used to receive the fastest lane number from the fastest lane decoder 220. The fastest lane number applied to the input 354 determines which pointer value is selected to be on the output 356. Each of the subtractors 350A, 350B, 350C and 350D includes two inputs 358 and 360 and a single output 362. The input 358 of each of the subtractors 350A, 350B, 350C and 350D is connected to the output 356 of the multiplexer 348 to receive the selected pointer value. The other input 360 of each of the subtractors 350A, 350B, 350C and 350D is used to receive the pointer value for a particular data lane. The subtractors 350A, 350B, 350C and 350D receive the pointer values from the datum detectors 218A, 218B, 218C and 218D, respectively. Each of the subtractors 350A, 350B, 350C and 350D subtracts the output pointer value from the multiplexer 348 from one of the pointer values from the datum detectors 218A, 218B, 218C and 218D to produce a relative lane skew value on the output 362. Thus, the relative lane skew values are the differences between the output pointer value from the multiplexer 348 and each of the pointer values from the datum detectors 218A, 218B, 218C and 218D. These relative lane skew values from the substractors 350A, 350B, 350C and 350D are then used by the first-in first-out buffers 108A, 108B, 108C and 108D to compensate for the data lane skews.

Figure 4:
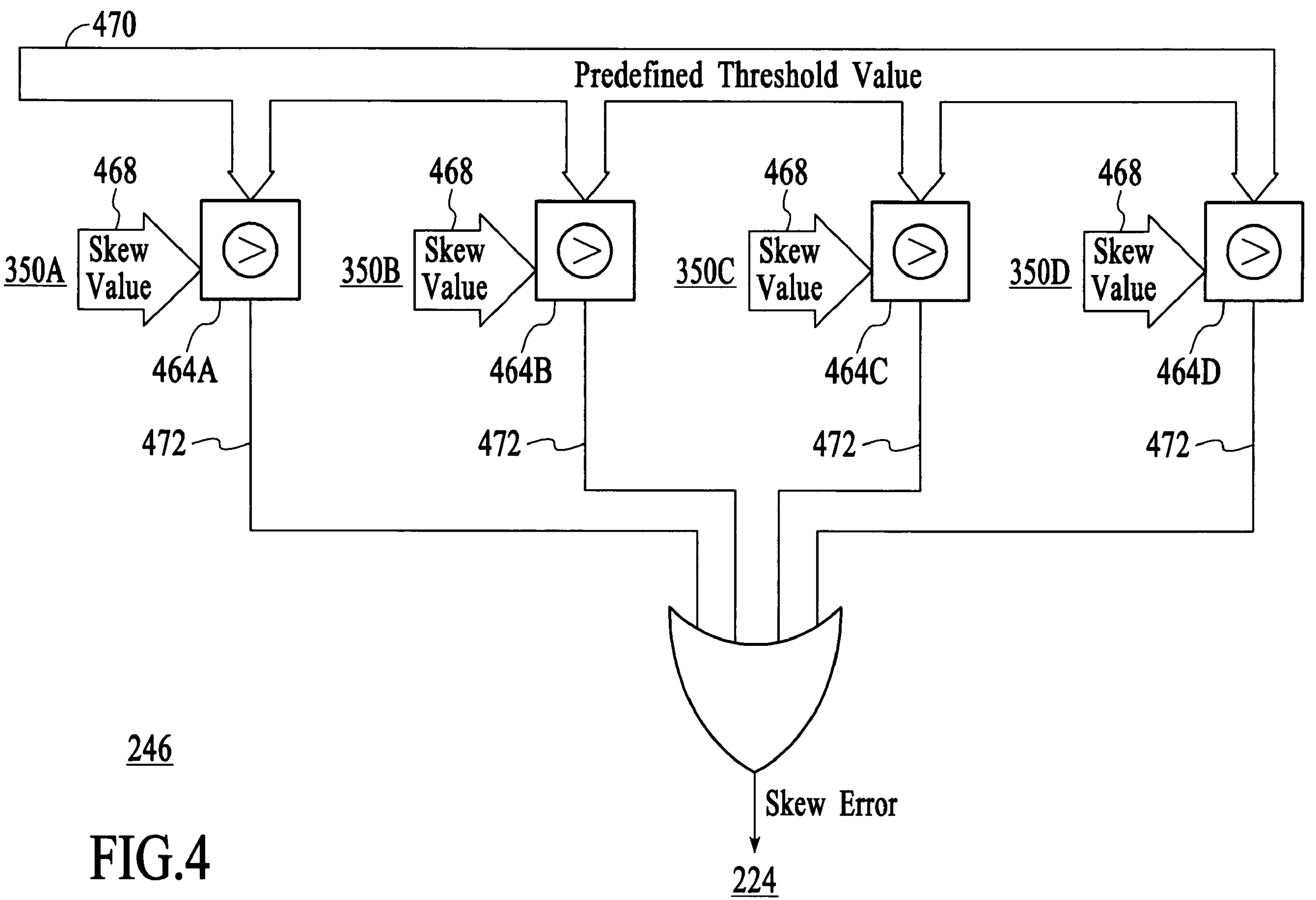
FIG. 4 is a block diagram of an error detection circuit included in the lane skew measurement unit of FIG. 2 in accordance with an embodiment of the invention.

Turning now to FIG. 4, a block diagram of the components of the error detection circuit 246 in accordance with an embodiment of the invention is shown. In this embodiment, the error detection circuit 246 includes four magnitude comparators 464A, 464B, 464C and 464D and an OR logic 466. Each of the magnitude comparators 464A, 464B, 464C and 464D includes two inputs 468 and 470 and an output 472. The inputs 468 of the magnitude comparators 464A, 464B, 464C and 464D is connected to the outputs 362 of the subtractors 350A, 350B, 350C and 350D, respectively, of the skew computation circuit 244 to receive the computed relative lane skew values. The other input 470 of each of the magnitude comparators 464A, 464B, 464C and 464D is used receive a predefined threshold value. Each of the magnitude comparators 464A, 464B, 464C and 464D operates to output a signal when the input relative lane skew value is greater than the predefined threshold value. The OR circuit 466 is connected to the outputs 472 of the magnitude comparators 464A, 464B, 464C and 464D. The OR circuit 466 operates to generate a skew error signal when at least one signal is received from the magnitude comparators 464A, 464B, 464C and 464D.

Turning back to FIG. 2, the lane skew registers 224 are connected to the skew computation unit 222 to receive the relative lane skew values and the skew error signal, if any. The received relative lane skew values (and the error signal) are temporarily stored in the lane skew registers 224, and subsequently, transmitted to the first-in first-out buffers 108A, 108B, 108C and 108D, where the relative lane skew values are used to compensate for the data skews in the data streams from the data lanes 104A, 104B, 104C and 104D, assuming that there was no skew error detected, i.e., no skew error signal from the skew computation unit 222.

Figure 5:
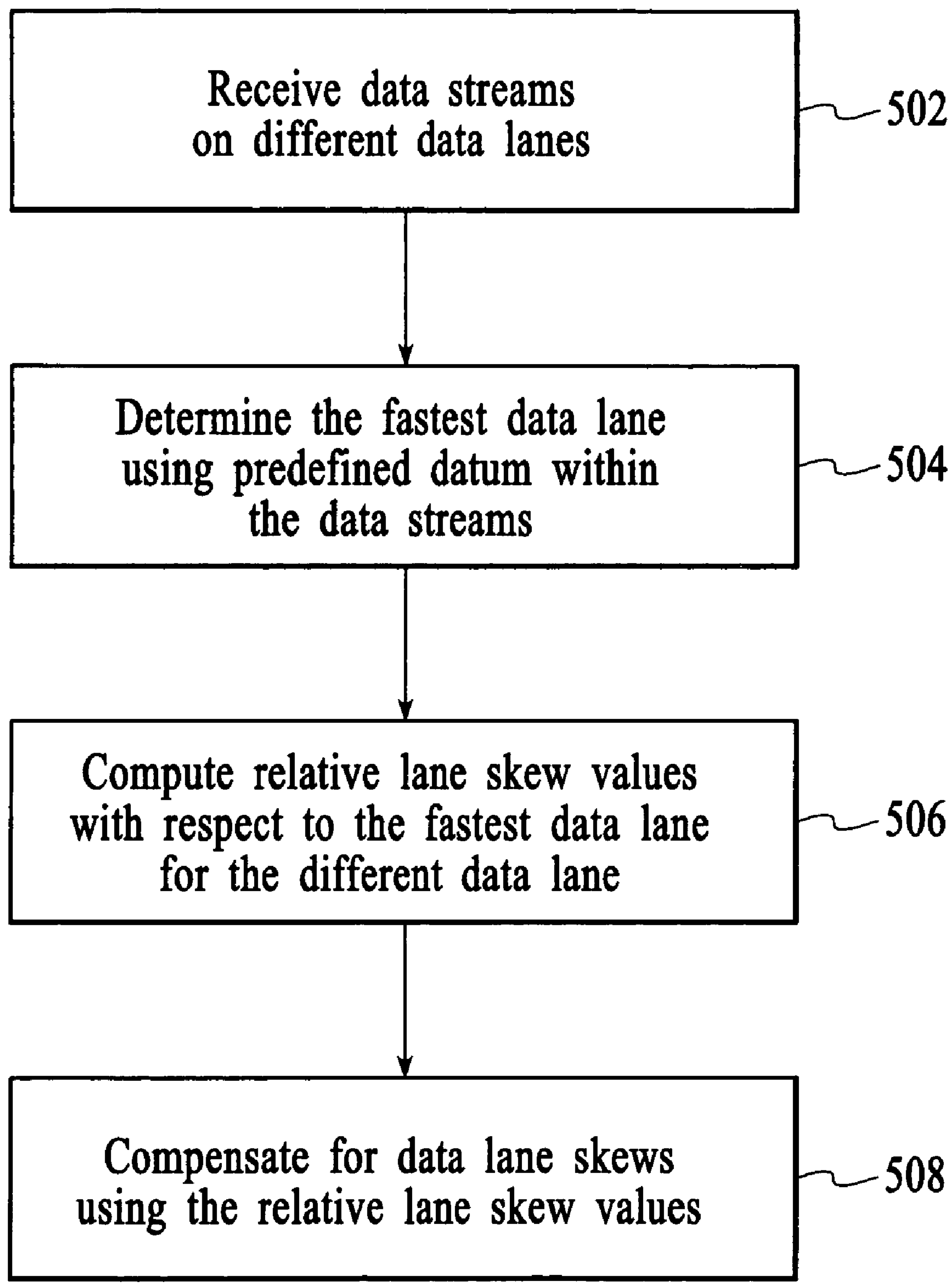
FIG. 5 is a flow diagram of a method for measuring and correcting data lane skews in accordance with an embodiment of the invention.

A method for detecting and correcting data lane skews in accordance with an embodiment of the invention is described with reference to a flow diagram of FIG. 5. At block 502, data streams transmitted on different data lanes are received. Each of the data streams contains a predefined datum. Next, at block 504, the fastest data lane of the different data lanes is determined using the predefined datum within the data streams. The fastest data lane is the data lane from which the predefined datum is first received. Next, at block 506, relative lane skew values with respect to the fastest data lane are computed for the data lanes. Next, at block 508, the data lane skews are compensated for using the relative lane skew values.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for measuring and correcting data lane skews, said system comprising:

a plurality of first-in first-out buffers to receive data streams transmitted on different data lanes, each of said data streams containing a predefined datum, said first-in first-out buffers being configured to output said data streams and to output internal pointer values for said data streams; and a skew measurement unit operatively connected to said first-in first-out buffers to receive said data streams and said internal pointer values from said first-in first-out buffers, said skew measurement unit being configured to determine the fastest data lane of said different data lanes, said fastest data lane being one of said different data lanes connected to one of said first-in first-out buffers to first receive said predefined datum, said skew measurement unit being further configured to compute relative lane skew values with respect to said fastest data lane for said different data lanes using each of said internal pointer values corresponding to said predefined datum in each of said data streams, wherein said first-in first-output buffers are configured to compensate for said data lane skews using said relative data lane skew values.

2. The system of claim 1 wherein said skew measurement unit comprises:

a plurality of datum detectors operatively connected to said first-in first-out buffers, each of said datum detectors being configured to detect said predefined datum within one of said data streams received at said first-in first-out buffers;

a fastest lane decoder operatively connected to said datum detectors, said fastest lane decoder being configured to determine said fastest data lane; and a skew computation unit operatively connected to said fastest lane decoder and said datum detectors, said skew computation unit being configured to compute said relative lane skew values.

3. The system of claim 2 wherein said datum detectors are configured to read said data streams from said first-in first-out buffers to detect said predefined datum within each of said data streams, said datum detectors including sticky registers to hold said internal pointer values of said first-in first-out buffers for said predefined datum detected within said data streams.

4. The system of claim 3 wherein said skew computation unit includes a plurality of subtractors to subtract an internal pointer value for said predefined datum transmitted on said fastest data lane from said internal pointer values for said predefined datum transmitted on said different data lanes to derive said relative lane skew values.

5. The system of claim 4 wherein said skew computation unit further includes a multiplexer to select said internal pointer value for said predefined datum transmitted on said fastest data lane from said internal pointer values transmitted on said different data lanes so that said internal pointer value can be applied to said subtractors.

6. The system of claim 2 wherein said fastest lane decoder includes combinational logics to generate an all found signal when said predefined datum has been found within each of said data streams transmitted on said different data lanes.

7. The system of claim 2 wherein said skew computation unit includes an error detection circuit configured to generate an error signal when at least one of said relative lane skew values exceeds a predefined threshold value.

8. The system of claim 7 wherein said error detection circuit comprises a plurality of magnitude comparators and an OR circuit, each of said magnitude comparators having inputs to receive one of said relative lane skew values and said predefined threshold value, each of said magnitude comparators having an output connected to said OR circuit such that said OR circuit generates said error signal in response to signals from said magnitude comparators.

9. The system of claim 2 wherein said fastest lane decoder includes storage registers configured to latch onto signals representing said fastest data lane when a datum found signal is first received from one of said datum detectors.

10. A method for measuring and correcting data lane skews, said method comprising:

receiving data streams transmitted on different data lanes at a plurality of first-in first-out buffers, each of said data streams containing a predefined datum;

outputting said data streams and internal pointer values for said data streams from said first-in first-out buffers;

determining the fastest data lane of said different data lanes using said data streams and said internal pointer values from said first-in first-out buffers and said predefined datum within said data streams, said fastest data lane being one of said different data lanes from which said predefined datum is first received;

computing relative lane skew values with respect to said fastest data lane for said different data lanes using each of said internal pointer values corresponding to said predefined datum in each of said data streams; and compensating for said data lane skews using said relative lane skew values.

11. The method of claim 10 wherein said determining said fastest data lane includes reading said data streams from first-in first-out buffers to detect said predefined datum within each of said data streams, including holding said internal pointer values of said first-in first-out buffers for said predefined datum detected within said data streams.

12. The method of claim 11 wherein said determining said fastest data lane includes latching onto signals representing said fastest data lane when a datum found signal is first generated in response to detection of said predefined datum within one of said first-in and first-out buffers.

13. The method of claim 11 wherein said computing said relative lane skew values includes subtracting an internal pointer value of said predefined datum transmitted on said fastest data lane from an internal pointer value of said predefined datum transmitted on each of said different data lanes.

14. The method of claim 13 wherein said computing said relative lane skew values includes multiplexing said internal pointer values for said predefined datum transmitted on said different data lanes to select said internal pointer value of said predefined datum transmitted on said fastest data lane.

15. The method of claim 10 wherein said determining said fastest data lane includes generating an all found signal when said predefined datum has been found in each of said data streams transmitted on said different data lanes.

16. The method of claim 10 generating an error signal when at least one of said relative lane skew values exceeds a predefined threshold value.

17. A system for measuring and correcting data lane skews, said system comprising:

a plurality of first-in first-out buffers to receive data streams transmitted on different data lanes, each of said data streams containing a predefined datum, said first-in first-out buffers being configured to output said data streams and to output internal pointer values for said data streams;

a plurality of datum detectors operatively connected to said first-in first-out buffers to receive said data streams and said internal pointer values from said first-in first-out buffers, each of said datum detectors being configured to detect said predefined datum within one of said data streams received at said first-in first-out buffers;

a fastest lane decoder operatively connected to said datum detectors, said fastest lane decoder being configured to determine the fastest data lane of said different data lanes, said fastest data lane being one of said different data lanes to first transmit said predefined datum to one of said first-in first-out buffers; and a skew computation unit operatively connected to said fastest lane decoder and said datum detectors, said skew computation unit being configured to compute relative lane skew values with respect to said fastest data lane for said different data lanes using each of said internal pointer values corresponding to said predefined datum in each of said data streams, wherein said first-in first-output buffers are configured to compensate for said data lane skews using said relative data lane skew values.

18. The system of claim 17 wherein said datum detectors are configured to read said data streams from said first-in first-out buffers to detect said predefined datum within each of said data streams, said datum detectors including sticky registers to hold said internal pointer values of said first-in first-out buffers for said predefined datum detected within said data streams.

19. The system of claim 17 wherein said skew computation unit includes a plurality of subtractors to subtract an internal pointer value for said predefined datum transmitted on said fastest data lane from said internal pointer values for said predefined datum transmitted on said different data lanes to derive said relative lane skew values.

20. The system of claim 17 wherein said fastest lane decoder includes combinational logics to generate an all found signal when said predefined datum has been found within each of said data streams transmitted on said different data lanes.

* * * * *